July 15, 1941.    W. J. PASINSKI    2,249,224
CASH REGISTER
Filed Nov. 27, 1939    11 Sheets-Sheet 2
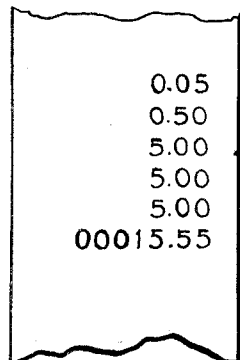
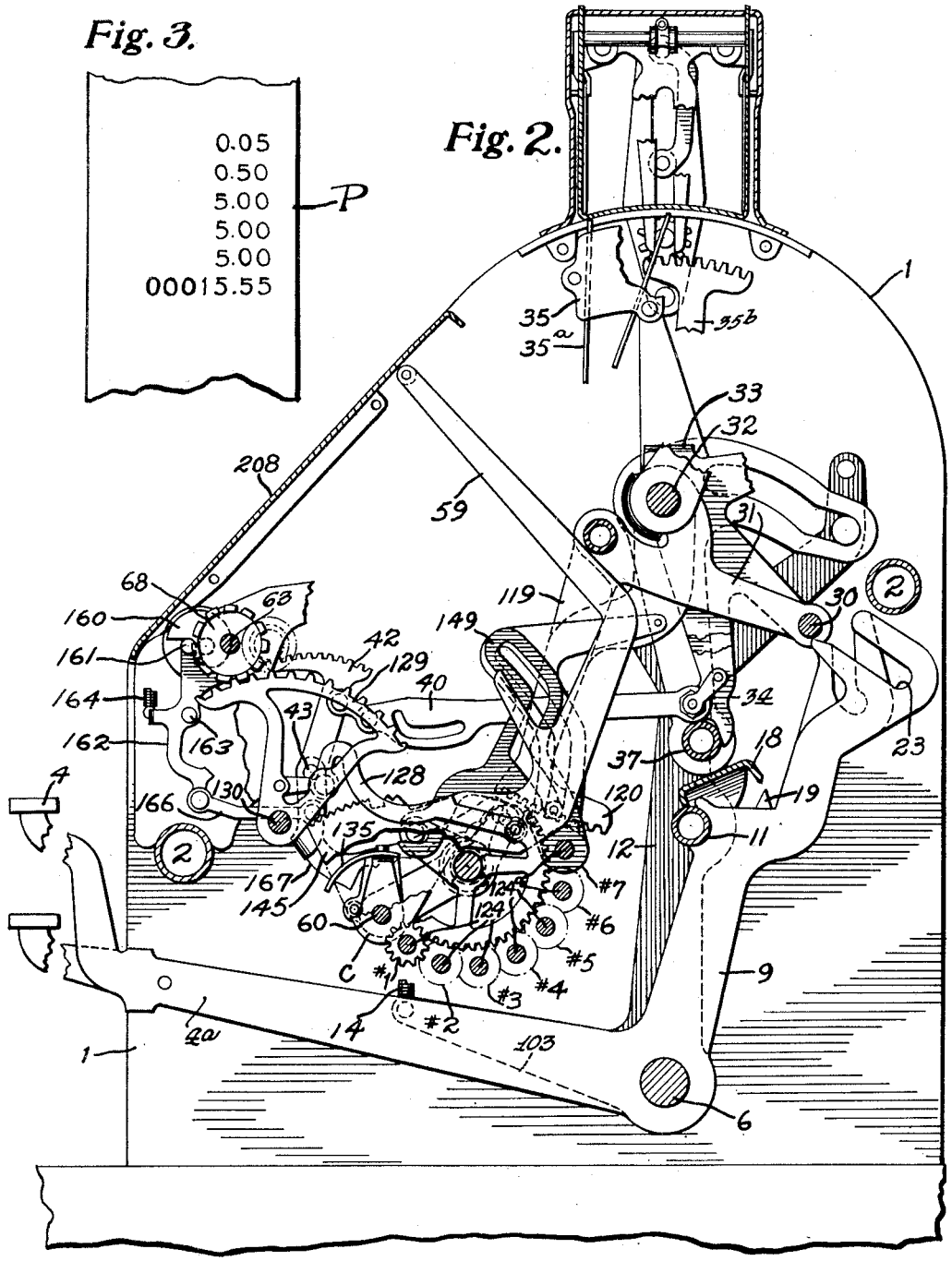
INVENTOR
Walter J. Pasinski
BY
Davis, Lindsey, Smith & Shonts
ATTORNEYS

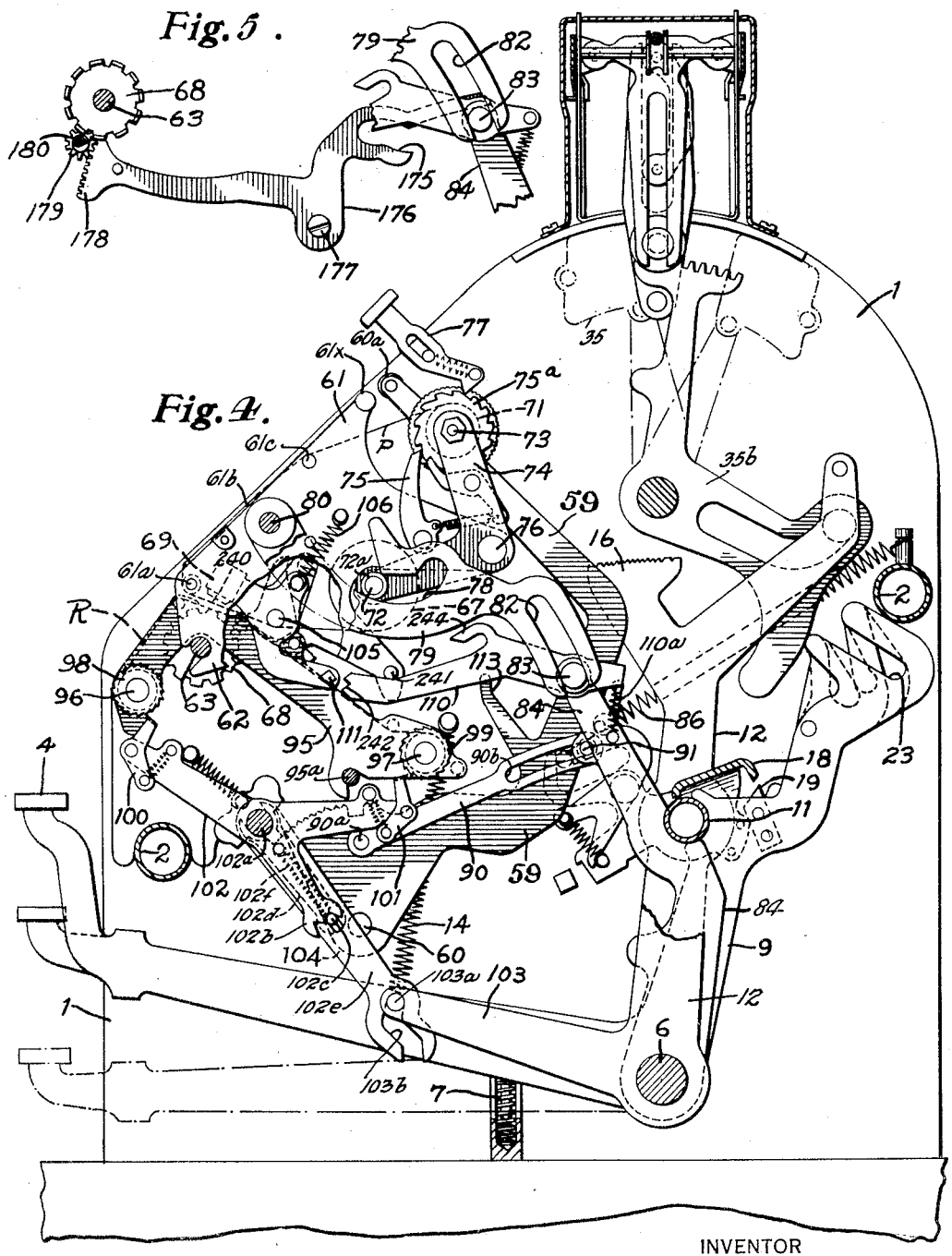

July 15, 1941.  W. J. PASINSKI  2,249,224

CASH REGISTER

Filed Nov. 27, 1939  11 Sheets-Sheet 4

INVENTOR
Walter J. Pasinski
BY
Davis, Lindsey, Smith & Shonts
ATTORNEYS

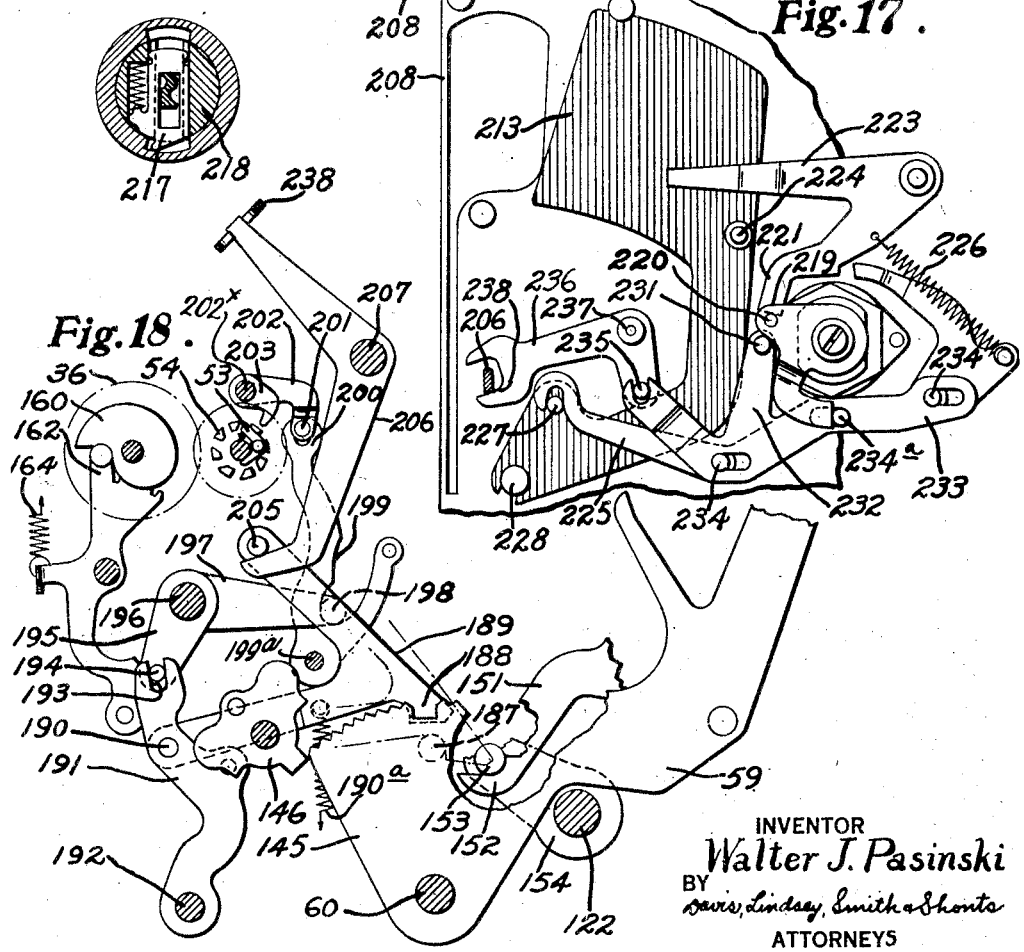

INVENTOR
Walter J. Pasinski
BY Davis Lindsey, Smith, & Shouts
ATTORNEYS

Patented July 15, 1941

2,249,224

UNITED STATES PATENT OFFICE 2,249,224

CASH REGISTER

Walter J. Pasinski, Howell, Mich., assignor to Burroughs Adding Machine Company, Detroit, Mich., a corporation of Michigan Application November 27, 1939, Serial No. 306,340

4 Claims. (Cl. 235—2)

This invention relates to cash registers. It is particularly concerned with providing a printing mechanism for a key-operated cash register.

In key-operated cash registers it is desirable to have the keys operable with as light a pressure as possible and to have this pressure constant throughout the stroke of the keys. In my prior Patent No. 2,070,059, February 9, 1937, an indicating, nonprinting, key-operated cash register is provided in which the key load is exceptionally light and uniform. The present invention comprehends the addition of a printing mechanism to this machine without appreciably increasing the key load or disturbing its uniformity.

The general object of the invention is to provide an improved key-operated printing cash register having an easy and uniform key action.

Other objects and advantages of the invention will appear from the following specification and drawings.

An embodiment of the invention is shown in the accompanying drawings in which:

Fig. 2 is a sectional elevation of the machine with the parts in normal position and illustrating more particularly the key levers and connections for indexing the printing means and the register pinions;

Fig. 3 is a sample of the printed record provided by the printing mechanism of the illustrated machine;

Fig. 4 is a sectional view similar to Fig. 2 with the parts in normal position but illustrating more particularly the paper feeding and printing mechanism;

Fig. 5 is a fragmentary detail of the aligning mechanism for the type wheels;

Fig. 14 is a fragmentary plan view of the lock controlled mechanism for controlling the total and subtotal operations;

Fig. 15 is a side elevation of the two keys employed for controlling total and subtotal printing, illustrating one key in the lock cylinder;

Fig. 16 is a vertical sectional detail through the lock cylinder;

Fig. 17 is a fragmentary rear elevation of the lock controlled mechanism for controlling the total and subtotal operations;

Fig. 18 is a fragmentary side elevation of the register pinion clearing or zeroizing mechanism;

Figure 1:
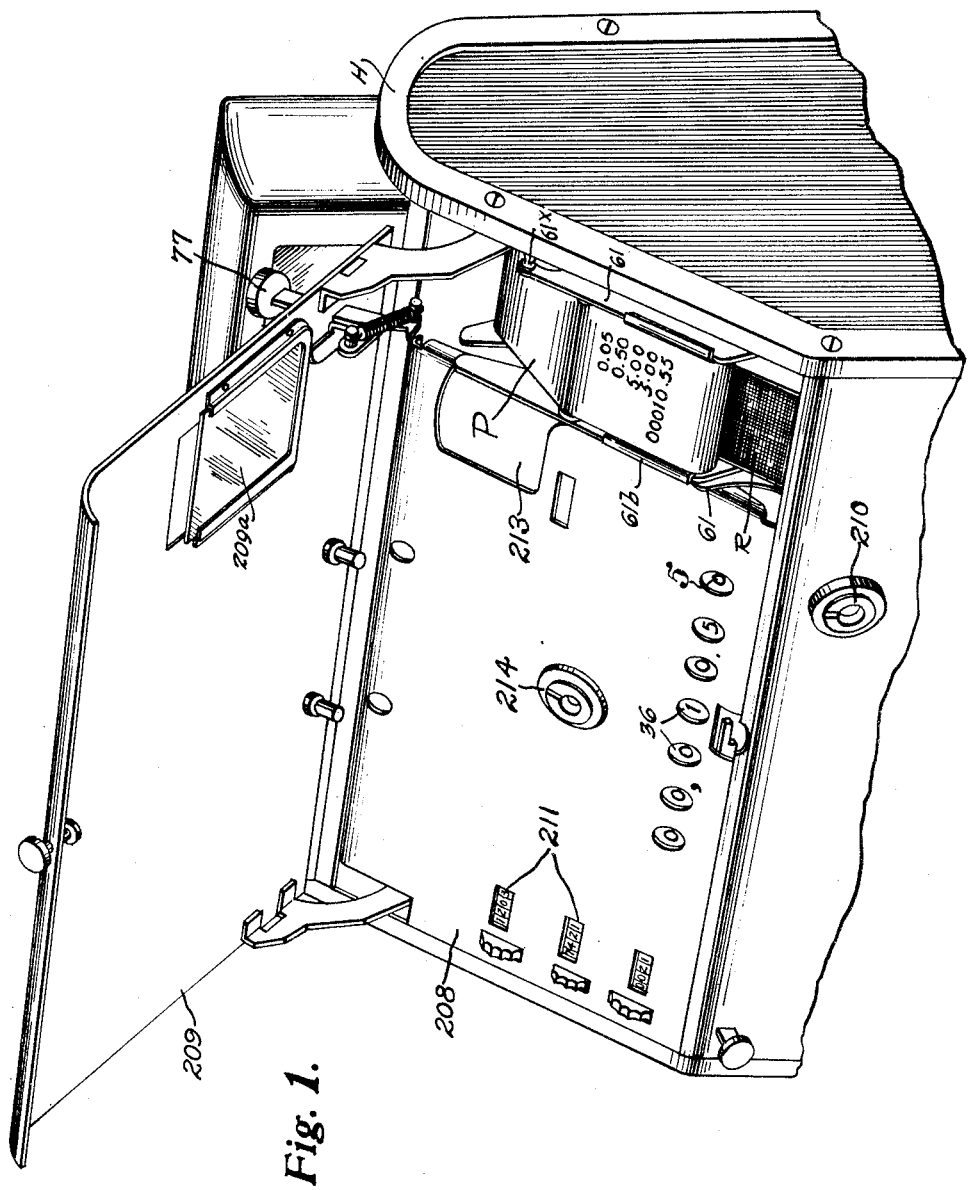
Figure 1 is an exterior perspective view of the upper portion of a cash register embodying this invention.

The invention is shown applied to the Burroughs key-operated cash register disclosed in Pasinski No. 2,070,059, February 9, 1937. The mechanism of this machine will be briefly described, reference being made to said Pasinski patent for further details. It is to be understood, of course, that the invention can be applied to other types of cash registers or calculating machines.

The present application is a continuation of my prior copending application Serial No. 147,429, filed June 10, 1937. Figs. 19 to 22, inclusive, of the present drawings have been added to illustrate the invention more clearly, said figures being duplicates of those in another of my copending applications, Serial No. 147,431, filed June 10, 1937, of which this application is a continuation-in-part.

GENERAL CONSTRUCTION

The operating parts of the machine are contained within a housing H (Fig. 1) and are supported between right and left side plates, the left side plate 1 being shown in Fig. 2. The plates 1 are maintained in spaced relation by tubular cross members 2 and by other cross shafts on which the mechanism of the machine is mounted.

The machine is operated for item entering by two rows of depressible keys 4 on the ends of key levers 4ª pivoted on the shaft 6. The keys may be depressed from the full to the dot-dash position of Fig. 4, said levers being urged to their normal positions by springs 7. There are three denominations of keys, namely, "cents," "tens-of-cents," and "dollars," with the usual number of keys in each denomination. Each key lever has a rearwardly and upwardly extending arm 9 positioned to engage a main operating shaft, or universal bail, 11 carried by arms 12 fixed to shaft 6 near each end thereof. The shaft 11 with its supporting arms 12 constitutes a rocking bail which is urged clockwise by springs 14 (Fig. 3) secured to forwardly projecting portions 103 of the levers 12. The upper ends of the levers 12 terminate in full-stroke sectors 16 (Fig. 4) engageable by pawls, not shown, that insure a full stroke being made at each key depression. A key coupler 18 is pivotally supported on the shaft 11 and spring urged clockwise. This coupler extends substantially across the machine and it is positioned so as to be engaged by projections 19 on the key levers 4ª of all denominations so that the keys may be partially depressed and latched to the key coupler, sometimes called "presetting."

The upper end 9 of each key lever has a differential cam slot 23 in it (Figs. 3 and 4), said slots being of different inclinations according to the value of the keys. A bail 30 (Fig. 2) is provided for each of the three denominations, said bail being of a length sufficient to be engaged by the cam slots 23 of the key levers of its denomination. Each bail is carried by spaced arms 31 journaled on a shaft 32. Each bail 30 is also connected to an indicator indexing yoke 33 (Fig. 7) by a forked arm 34. The yokes 33 are connected to indicator tab magazines 35 (Fig. 2) carrying indicator tabs 35ª bearing indicia from 1 to 9. The yoke 33 for each denomination is thus differentially positioned in accordance with the key depressed and the indicating mechanism is correspondingly indexed. After the magazines 35 have been indexed, the indexed tabs are raised by appropriate mechanism 35ᵇ which has not been illustrated in detail, the same being fully described in my prior Patent No. 2,070,061.

A registering mechanism, or totalizer, is provided comprising a plurality of register pinions 36ª (Fig. 5). This registering mechanism is of the type disclosed in my prior Patent No. 2,070,062, being also described in more detail in Horton 1,326,504. It is provided with a suitable tens-transfer mechanism and is operated as described in said Patent 2,070,062. This operating mechanism will be briefly described.

The register pinions 36ª are differentially actuated by the denominational bails 30. Since the parts operated by each of the three bails are alike, only one will be described. The bail 30 has a link 40 (Fig. 7) connected to an arm of its member 34. The forward end of the link 40 is connected by another link 41 to an actuator rack 42 pivoted at 43, there being an actuator rack for each denomination. The actuator rack 42 is in constant mesh with a gear 49 (Fig. 6) which carries a pawl 53 spring urged to a position to engage the face of studs 54 on a gear 55. The gear 55 is in mesh with a register pinion 36ª (Fig. 6) that is fixed to the register indicator dial 36. The pawl 53 is mounted so that, when the gear 49 is rotated counterclockwise (Fig. 6), it will engage one of the studs 54 and rotate the gear 55, but, when the gear 49 is rotated clockwise, the pawl will merely pass over the studs 54.

Figure 7:
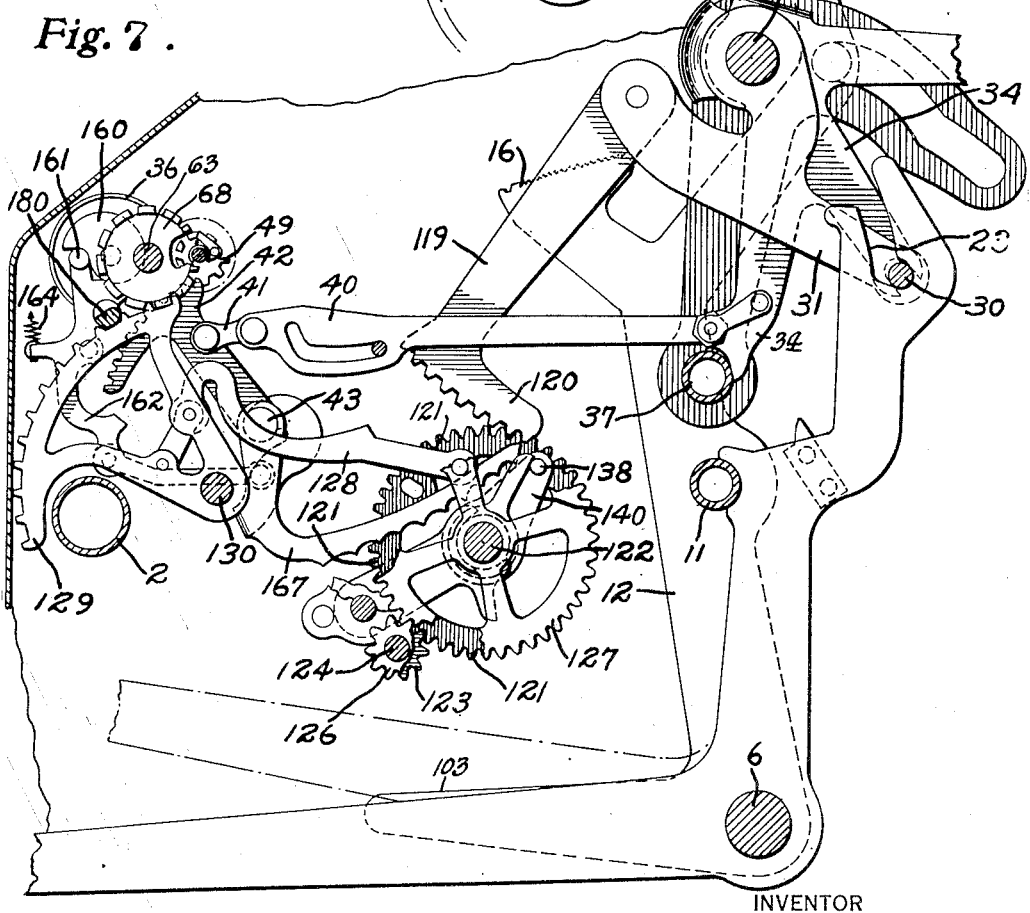
Fig. 7 is another view of a portion of the mechanism shown in Fig. 2 and illustrating the parts in position with the "9" key fully depressed, but before the amount has been entered in the register pinions and before the key has returned to normal position.

The arrangement is such that, when a selected item key of a denomination is depressed, the corresponding bail 30 is moved forward, links 40 and 41 are thrust forward, and the actuator rack 42 is rocked counterclockwise from the position of Fig. 2 to that of Fig. 7 and to an extent corresponding to the value of the key depressed. This movement of the actuator rack rotates the gear 49 clockwise but this has no effect on rotating the registering mechanism. When the item key is released, the bail 30, links 44 and associated parts are restored to normal by restoring bail 37 (Figs. 2 and 7) which is urged counterclockwise or to the right in Fig. 7 by springs not shown. During this restoring movement, the actuator rack 42 is rocked clockwise which causes the gear 49 to be rotated counterclockwise, and this movement is transmitted to the register pinion which is rotated an amount corresponding to the value of the key depressed. For further details of the operating mechanism for the register, reference is made to said prior Patent No. 2,070,062.

PRINTING

The section of the machine by means of which printing is accomplished includes equipment for handling paper as well as the printing mechanism proper. These parts are on the right-hand side of the machine and within the housing H as shown in Fig. 1. The several mechanisms will be described separately under the headings (1) paper section; (2) indexing the type-carrying members; and (3) printing hammer operation.

1. *Paper section*

Figure 21:
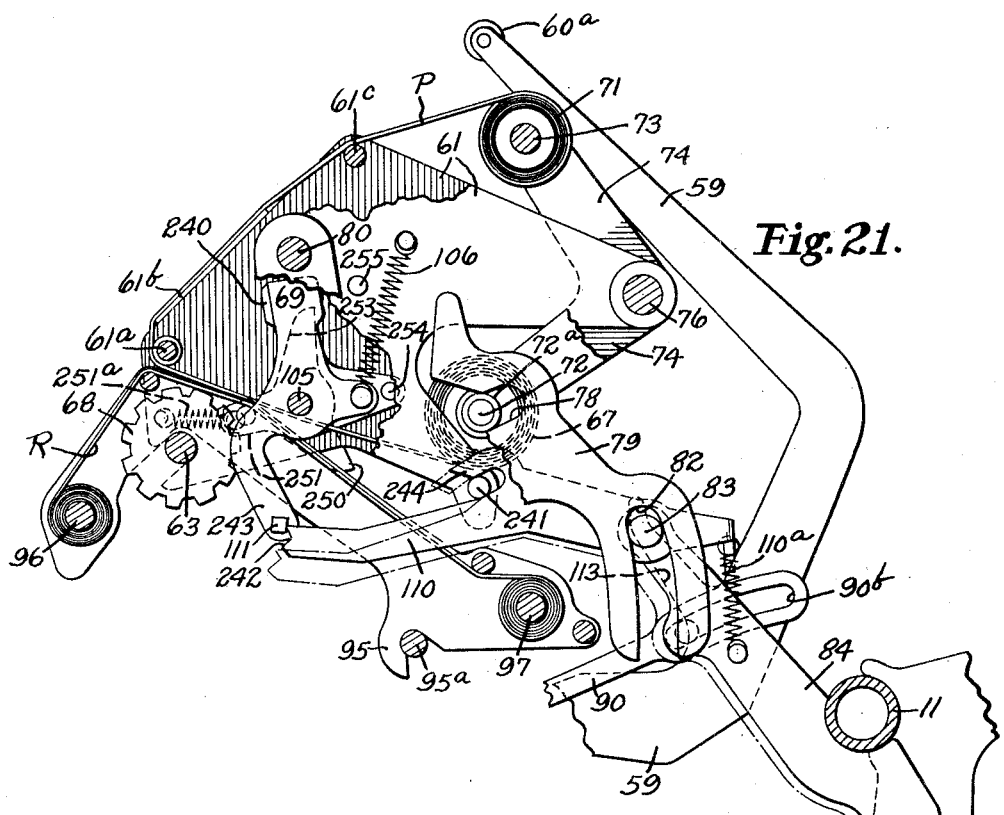
Fig. 21 is an enlarged partial detailed section of the printing mechanism showing the printing hammer in raised position during an item-printing operation.

Printing is performed on paper in the form of a continuous record strip P (Figs. 1, 4 and 21) extending from a supply roll 67 to a storage roll 71 (Figs. 4 and 21). The paper equipment is of the type in which, during each machine operation, the paper is moved from a position where the last entry is visible to a printing position where printing occurs, after which the paper is returned to a position where the currently printed entry is visible, line spacing occurring automatically.

Referring to Figs. 4 and 21, the paper strip P passes from the supply roll 67 under a shaft 106, past the printing line of the printing mechanism later described, about a stationary shaft 61ª, over a stationary paper table 61ᵇ, and over a stationary guide 61ᶜ to the storage roll 71. In the normal position of the parts, the last entry, such as the total "00010.55" in Fig. 1, is visible through a sight opening 209ª in the cover 209. The spools on which the supply and storage rolls 67 and 71 are wound are carried by shafts 72 and 73, respectively, supported by a pair of spaced bell crank levers 74 pivoted on a shaft 76, one of said bell cranks 74 being shown in Fig. 4 and both in Fig. 21. The paper strip is slid over the stationary guides and paper table to bring it to printing position by rocking the bell cranks 74 counterclockwise about shaft 76 from the position of Fig. 4. After printing occurs the bell cranks are rocked back to normal and the paper strip is returned to its former position except as it is automatically line spaced so that the currently printed entry will be the visible one. Automatic line spacing is accomplished by a pawl 75 (Fig. 4) which engages a ratchet wheel 75ª as the bell cranks 74 rock counterclockwise in Fig. 4. The parts are arranged so that pawl 75 causes the storage roll to be rotated a distance sufficient to move the paper strip one line space. During the return movement of the bell cranks 74, pawl 75 slides over the teeth of the ratchet wheel 75ª. The paper may also be line spaced manually at the option of the operator by means of a key 77 (Fig. 4) having a nose positioned to engage the teeth of the ratchet wheel 75ª.

The bell cranks 74 are rocked by means of an arm 79 (Figs. 4 and 21) pivoted on a shaft 80 carried by the side plates of the machine. This arm has a cam slot 78 engaging a roller 72ª on the right-hand end of shaft 72. The rear end of the arm 79 has a cam slot 82 engaging a bail carried by two arms 84 pivoted on the shaft 6 and positioned in front of the universal bail 11, said arms and bail being urged clockwise in Fig. 4 by springs 86. When an amount key is depressed, the universal bail 11 is moved forward which rocks the arms 84 and bail 83 counterclockwise. This rocks the arm 79 clockwise to swing the bell cranks 74 counterclockwise, thereby moving the paper from visible to printing position.

When the amount key is released, the arms 84 are returned clockwise by their springs 86 to restore the parts to normal which includes rocking the bell cranks 74 to normal to thereby return the paper to visible position.

The supply and storage spools are also rocked to move the paper from visible to printing position and return by means of the total-taking lever 59. This lever is pivoted at 60 (Fig. 4) and, when a total is to be taken, it is pulled forward by the handle 60ª which rocks the lever about the pivot 60 in a counterclockwise direction. Pivoted to the total lever 59 at 90ª (Fig. 4) is a link 90 extending rearwardly and provided with a slot 90ᵇ engaging over a stud 91 on the left-hand arm 84. This slot is of such length that it does not interfere with the forward movement of the arms 84 when the latter are moved by the amount keys at which time, of course, the total lever 59 remains stationary. When the total lever is pulled forward to take a total, the link 90, acting on the stud 91, pulls the arms 84 forward, thereby moving the bail 83 forward and rocking the arm 79 in the same manner as when an amount key is depressed. When the total lever is restored rearward by the operator, which action may be assisted by a spring described later, the arm 79 and associated bell cranks 74 and the paper rolls are restored to normal. Thus, the paper is shifted from visible to printing position and returned during the total-taking operation as well as during depression of the amount keys.

The paper equipment can be rocked as a unit to an accessible position and it can also be detached as a unit from the machine. For this purpose the parts are mounted in two side plates 61 (Figs. 1 and 4) whose lower ends 62 are notched to go over a shaft 63 carried by the frame plates of the machine. These plates and the paper equipment, including the storage and supply rolls, can be rocked counterclockwise by means of the handle 61ˣ (Figs. 1 and 4) to bring the paper equipment to a more accessible position. Also, the unit can be removed by lifting it off the shaft 63.

The various novel features of the paper section are not claimed herein, the same being the subject matter of my copending application Serial No. 147,430, filed June 10, 1937, in which this paper equipment is also explained in more detail.

2. Indexing the type-carrying elements

Figure 8:
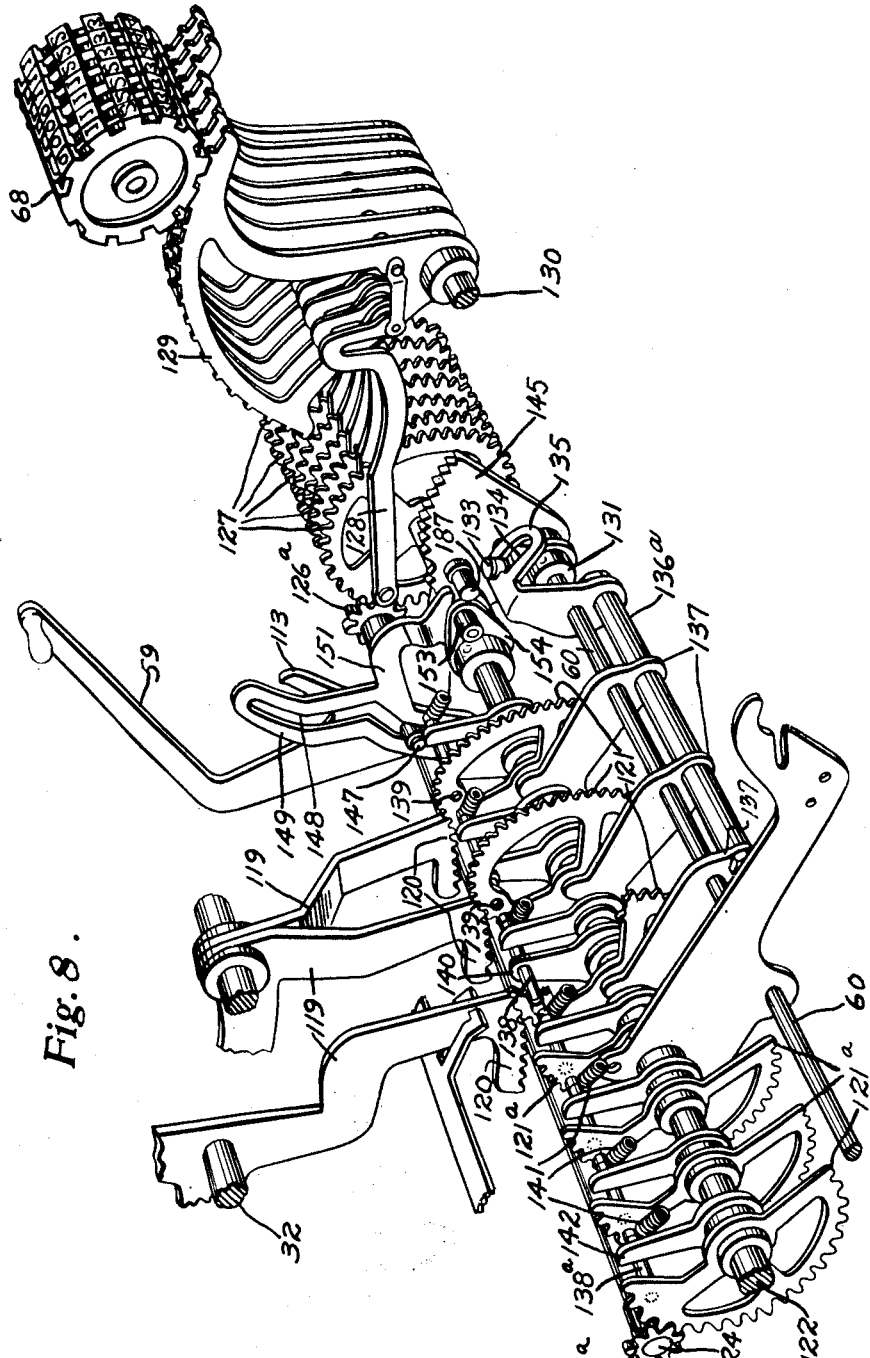
Fig. 8 is a perspective view of the indexing mechanism for indexing the type wheels for both item-entering and totaling operations.
Figure 19:
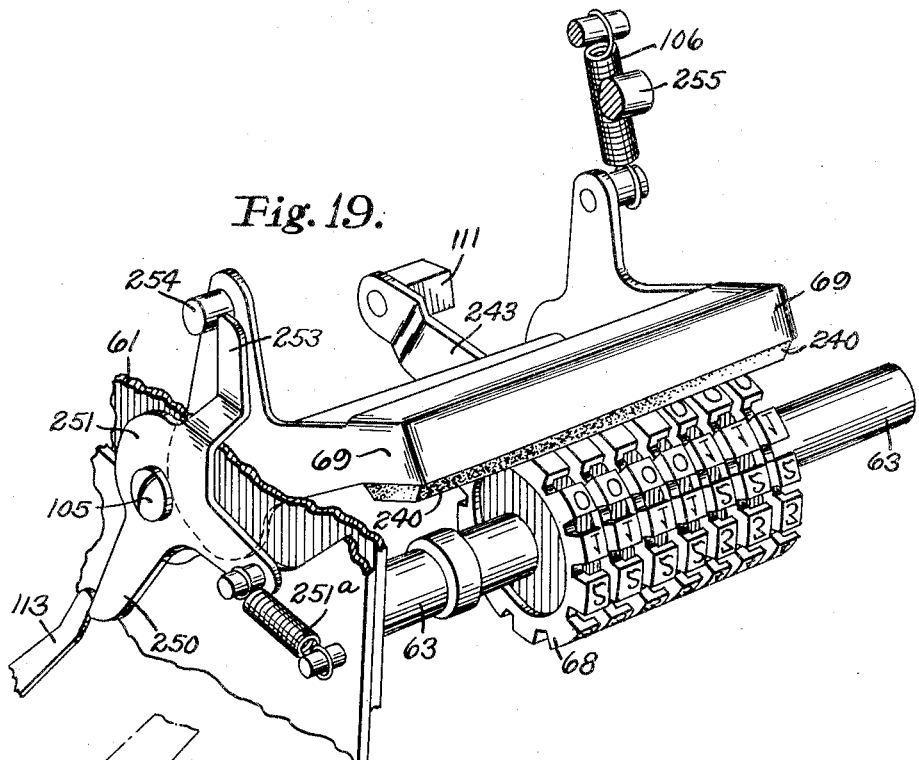
Fig. 19 is an enlarged perspective view of portions of the printing mechanism, particularly the type wheels and printing hammer.

The type used for printing items and totals are carried by type-carrying members in the form of type wheels 68, best shown in Fig. 19. These type wheels are rotatably mounted on a shaft 63 and are differentially positioned under the control of the amount keys in item entering and under the control of the register pinions in total taking. A novel construction and arrangement has been provided for promoting easy key depression, the nature of which will appear as the description proceeds, but attention is called at this point to the fact that the three lower orders of type wheels are used for printing items while all of the type wheels are used for printing totals and that, normally, as shown in Figs. 8 and 19, the item-printing wheels have their "O's" at the printing line while pinions in the higher orders, of which there are four, have blank spaces at the printing line. For convenience in description, the three lower order type wheels will be called the "item" type wheels while the four higher orders will be called the "extra" type wheels. The indexing of the "item" type wheels will be explained first.

Figure 9:
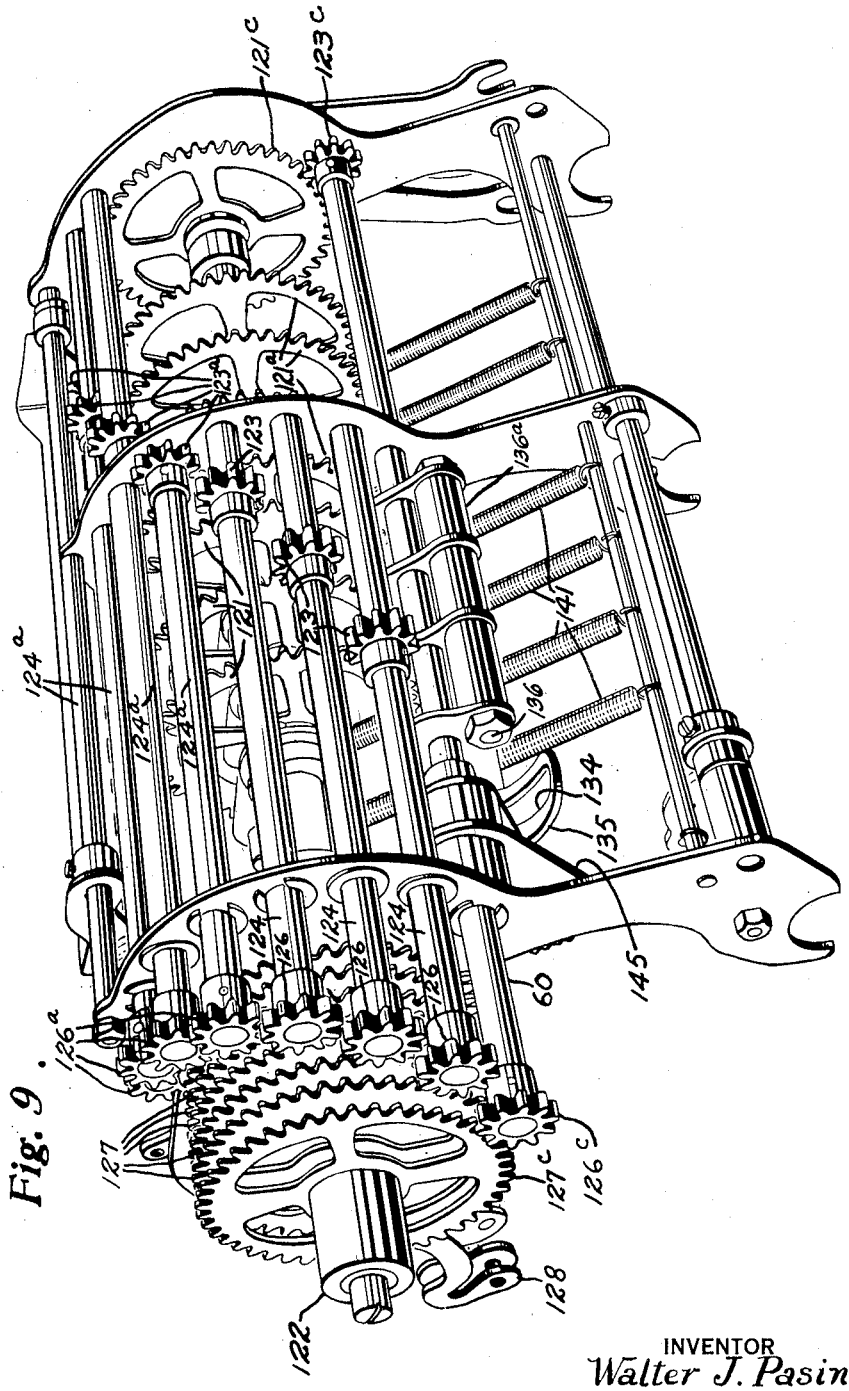
Fig. 9 is a perspective view of the cluster of shafts and gears used to index the printing mechanism, the view being taken from beneath the cluster to more clearly show the arrangement.

The "item" type wheels are indexed under the control of the three denominational bails 30 that are differentially positioned by the various amount keys of each denomination. Referring to Fig. 7, it will be recalled that the denominational bails 30 are carried by arms 31 pivoted on the shaft 32. Each of these yokes has a forwardly extending arm 119 having a toothed sector 120 on its end. Each toothed sector meshes with a toothed sector 121 pivoted on a shaft 122 with the result that, when an amount key is depressed in any denomination, the corresponding sector 121 will be differentially positioned in accordance with the value of the key. Each sector 121 meshes with a gear 123 (Fig. 7) and these gears are mounted on individual shafts 124, as best shown in Figs. 2 and 9. These shafts extend to the right, viewing the machine from the front and as viewed in Fig. 8. Mounted toward the right-hand end of each shaft is a gear 126, said gears being numbered No. 1, No. 2 and No. 3 in Fig. 2. The gears 126 engage, respectively, gears 127, the engagement being with the three right-hand ones, as shown in Fig. 8, or the three left-hand ones in Fig. 9 except that, in Fig. 9, the extreme left-hand gear is for a special character printing, later explained. Each gear 127 is connected by a link 128 (Fig. 8) to a sector 129 pivoted on a shaft 130. Each of the sectors 129 meshes with a type wheel 68 and constitutes an operating sector for said wheel.

From the above it will be clear that, when an amount key is depressed, the bail 30 in its denomination is moved differentially which rocks the arm 119 and the sector 120 to a corresponding position. This rocks the sector 121, rotates gear 123, shaft 124, gear 126 and gear 127 to move the link 128 and rock the sector 129 to rotate the type wheel 68 for the denomination in which the key has been depressed to a position corresponding to the value of the key. Fig. 2 shows a sector 129 in normal position and Fig. 7 shows it in a moved position. Thus, the "item" type wheels in the three lower orders are differentially positioned through positive connections with the amount keys.

An extra type wheel for printing special characters, not illustrated in Fig. 8, is indexed in a similar manner to the several orders of the foregoing mechanism by means of gears 121c, 123c, 126c and 127c, illustrated in Fig. 9. This mechanism has been omitted from most of the figures in order not to confuse the drawings. It will be understood that this order of mechanism is under the control of the character section of the machine which includes the usual "Cash," "No sale" and "Paid out" indications, the latter two being controlled by the "No sale" and "Paid out" keys.

When a total is to be taken, the type wheels must be differentially positioned under the control of the register and this applies not only to the "item" type wheels, but also to the "extra" type wheels that normally have blank spaces at the printing line. In order that the "item" type wheels may be positioned under the control of the register, it is necessary that the connections with the item keys be disabled and this portion of the mechanism will be described first.

Figure 10:
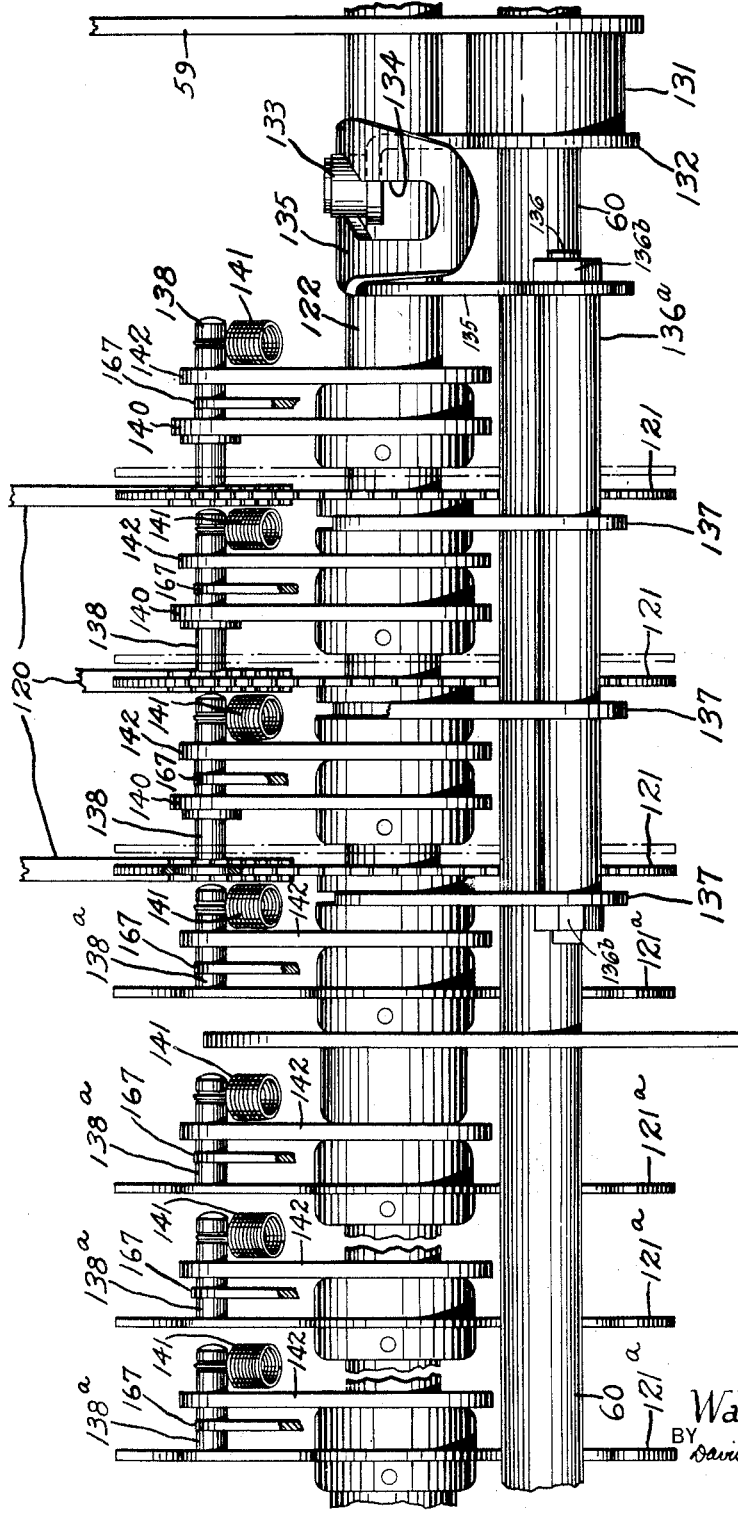
Fig. 10 is a front elevation of a portion of the mechanism illustrated in Fig. 8.

Referring to Fig. 8, the total-taking lever 59 is pivoted on the shaft 60. Fixed to this lever and rotatable on said shaft 60 is a collar 131 to which is fixed an arm 132 (Fig. 10), carrying a stud 133 operating in a cam slot 134 of a member 135 slidably mounted on the shaft 60. The member 135 is fixed by means of a shaft 136, collars 136a, and nuts 136b to three rearwardly projecting arms 137 also slidably mounted on the shaft 60. The shape of the cam slot 134 is such (Fig. 10) that, when the total lever 59 is pulled forward, the member 135, together with arms 137, will be slid to the right in Figs. 8 and 10 at the beginning of the movement of said total lever. The rear ends of the arms 137 are positioned in slots in the hubs of the three sectors 121 (Fig. 10). Said sectors 121, in addition to being rotatable on shaft 122, are also slidable on said shaft. When the arms 137 are moved to the right (Fig. 10) by the forward pull on total-taking lever 59, the sectors 121 are also moved to the right to the dot-dash position shown in Fig. 10 and said sectors are thus disengaged from the sectors 120. Thus, the connection between the amount keys and the type wheels in the three lower orders is disabled.

Before describing how all the type wheels are indexed under the control of the register, the operating connections for the "extra" type wheels will be explained. Each "extra" type wheel has an operating sector 129 (Fig. 8) pivoted on the shaft 130 and connected by a link 128 to its gear 127. Each gear 127 meshes with a gear 126a (Figs. 8 and 9), said gears being numbered No. 4, No. 5, No. 6 and No. 7 in Fig. 2. The gears are carried by individual shafts 124a (Fig. 9) and the left-hand ends of these shafts carry gears 123a (Figs. 8 and 9) that mesh with sectors 121a (Fig. 8) pivoted on the shaft 122 which, it will be recalled, is the shaft that carries the sectors 121 for the three lower orders. Thus, the sectors 121a are operatively connected to their individual type wheels.

Figure 6:
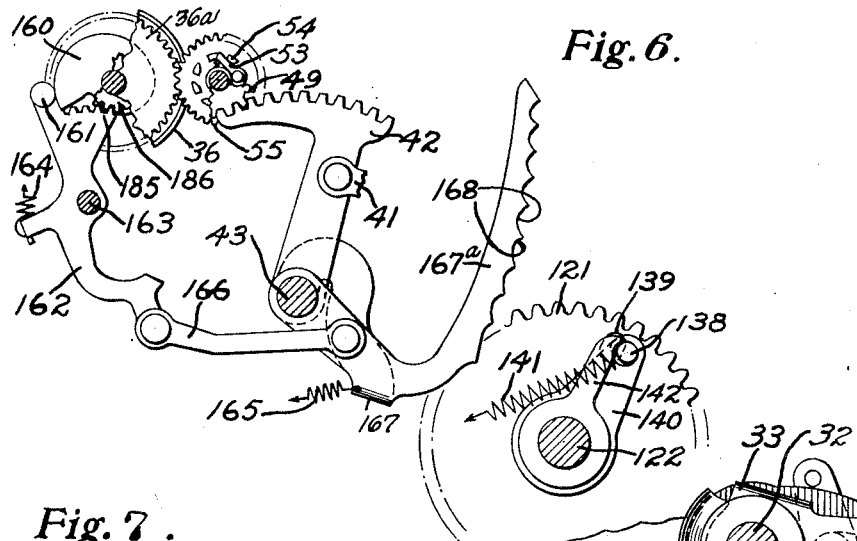
Fig. 6 is a partial side elevation illustrating the means controlled by the register for total printing, the parts being in the position they occupy after the "9" key has been depressed and released and the amount entered in the register pinions.

In order that the type wheels may be differentially positioned under the control of the register, mechanism illustrated in Fig. 6 is provided. Each register pinion 36a has a small cam 160 associated with it, as described in more detail in Horton 1,326,504, whose edge is contacted by stud 161 on a lever 162 pivoted on the shaft 163 and urged counterclockwise, as viewed in Fig. 6, by a spring 164. The forward lower end of each arm 162 is connected by a link 166 with a yoke member 167 having an upwardly projecting arm 167a provided with notches 168 corresponding to the digital values of the positions of the register pinion. The yoke 167 is urged clockwise, as viewed in Fig. 6 by a spring 165. The parts are arranged so that each notched arm 167a continuously reflects the position of its register pinion and thus forms a differential stop, which stops may be employed to arrest the type wheels in positions corresponding to the amount in the register.

Figure 11:
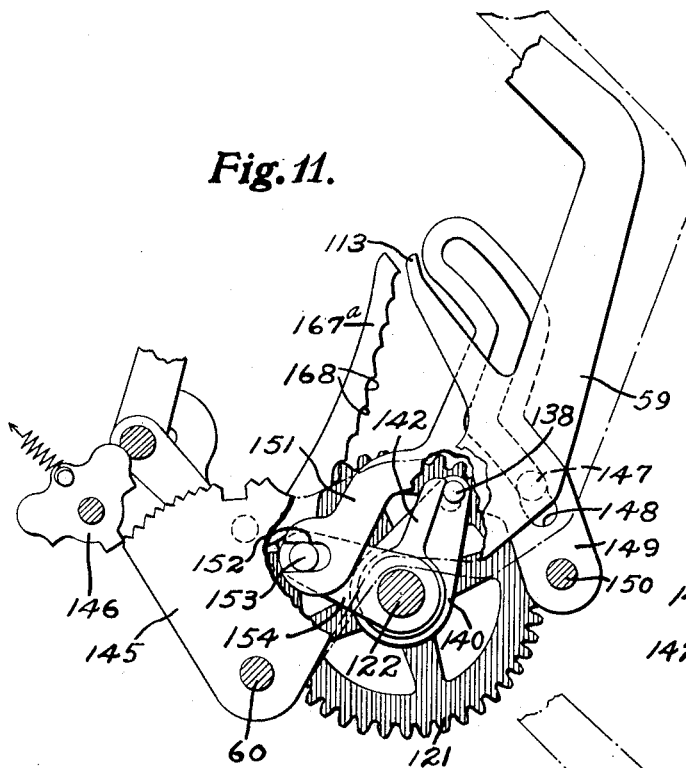
Fig. 11 is a side elevation of a portion of the total lever and associated parts, illustrating the lever in partially moved position.
Figure 12:
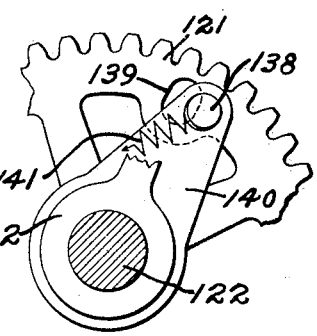
Fig. 12 is a fragmentary detail of a portion of the printing indexing connections in normal position.
Figure 13:
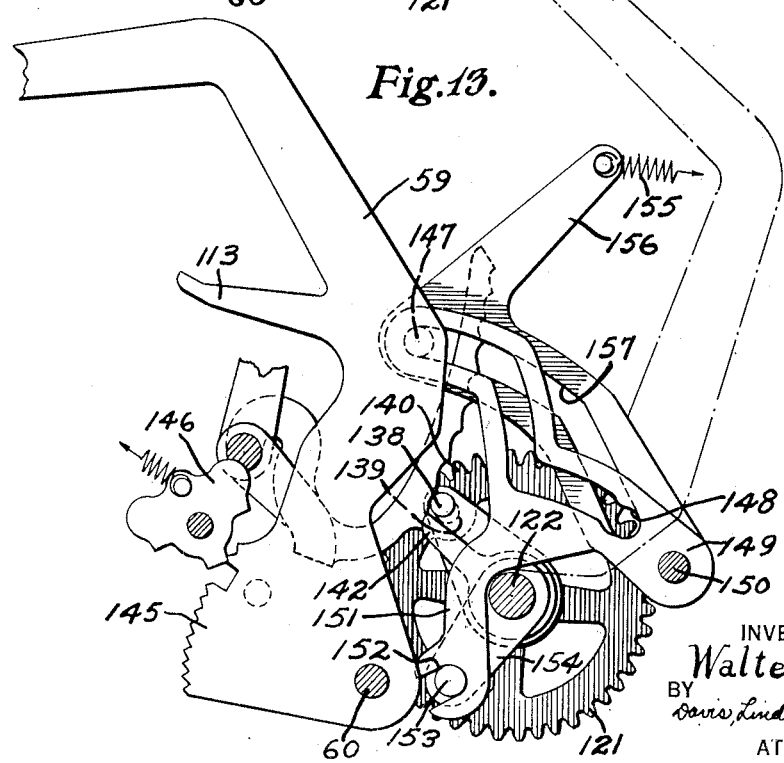
Fig. 13 is a fragmentary elevation of the elements shown in Fig. 11 illustrating the parts in the position they occupy with the total lever in full forward position.

For differentially positioning the type wheels, the arms 167a are engaged by studs 138 as shown in Figs. 11 and 13. There are two sets of these studs 138 and 138a, as shown in Fig. 10, the right-hand set of three in Fig. 10 comprising the studs 138 for the three lower orders or "item" type wheels and the left-hand set comprising studs 138a for the four "extra" type wheels. The studs 138a are carried by the sectors 121a but the studs 138 are carried by arms 140 (Figs. 6, 8, 11 and 12) pivoted on the shaft 122. The studs 138 with their arms 140 and the studs 138a with their sectors 121a are urged counterclockwise (Figs. 6 and 12) by individual springs 141 (Fig. 10), which is in a direction to cause the studs 138 and 138a to move into engagement with the notches in the arms 167a. Normally, however, the studs 138 and 138a are prevented from moving into engagement with arms 167a by arms 142 fixed to the shaft 122 (Figs. 6, 10 and 11).

Referring to Figs. 11 and 13, there is fixed to the shaft 122 an arm 154 carrying a stud 153 operating in a slot 152 in the forwardly projecting arm 151 of a cam member 149 pivoted on the shaft 150 (Fig. 13). The member 149 has a cam slot 148 in which is positioned a stud 147 on the total lever 59 (Fig. 8). The arrangement is such that, when the total lever is pulled forward, the member 149 is rocked counterclockwise (Fig. 11) and the member 149, acting through the arm 151, stud 152 and arm 154, rocks the shaft 122 counterclockwise, thereby moving the arms 142 counterclockwise away from the studs 138 and 138a. This frees said studs so that they can be moved counterclockwise by their springs 141 until the studs engage notches in the respective arms 147a. Thus, when the total lever 59 is pulled forward, the arms 140 with the studs 138 and the sectors 121a with their studs 138a are differentially positioned in accordance with the positions of the arms 167a controlled by the register pinions. When the total lever is moved rearward, the arms 142 act as restoring arms to pick up the studs 138 and 138a to restore the parts to normal.

In order that the type wheels 68 may be positioned, the studs 138 must be connected to the "item" type wheels and provision is made for causing this to occur automatically when the total lever is pulled forward.

As previously explained, the "item" type wheels normally have their "O's" at the printing line while the "extra" type wheels have blank spaces at said printing line, their "O's" being one step removed from the printing line. All the type wheels must be coordinated in total taking, or, to put it another way, the "item" and the "extra" type wheels must be put in step.

Referring to Fig. 10, it will be observed that the studs 138 project from both sides of the arms 140. The portions of these studs projecting to the left in Fig. 10 are positioned to engage openings 139 (Fig. 12) in the sectors 121 when said sectors are slid laterally by the movement of the total-taking lever 59. Normally, however, the studs 138 for the sectors 121 for the "item" type wheels are not in line with the openings 139 but are one step removed therefrom, as shown in Fig. 12. As the total lever 59 is moved forward, the arms 142 that normally hold the studs 138 and 138ᵃ against movement are rocked to release said studs for counterclockwise movement (Fig. 12) under the urge of the springs 141. Since the studs 138ᵃ are directly connected to the sectors 121ᵃ, said sectors will be moved immediately and, through their connections with the "extra" type wheels, will move said type wheels immediately. However, the sectors 121 and their connections to the "item" type wheels will not be moved immediately because the arms 140 carrying studs 138 must move one step before the studs 138 will be in alignment with the openings 139 in the sectors 121. But, after the studs 138 have moved one step, the sectors 121 will be slid laterally to connect themselves to said studs, after which said sectors move with said studs to differential positions governed by the register-controlled arms 167ᵃ in the three lower orders. The effect is that the two sets of type wheels are coordinated, or, to put it another way, the "extra" type wheels are moved a step to put them in step with the "item" type wheels before the entire group is moved to total-taking position.

The timing of the parts is obtained by the irregular shaping of the cam slot 148 in the cam member 149 (Fig. 11). This slot has an initial inclined portion which, during the initial movement of the total-taking lever 59, causes the arms 142 to be moved to free the studs 138 and 138ᵃ for movement. During this movement, the studs 138ᵃ move a step to move the "extra" type wheels a step and the studs 138 move into line with the openings 139 in the sectors 121. The cam slot 148 then has a dwell portion and, while this dwell is operative, no further movement of the arms 142 occurs and the studs 138 and 138ᵃ are held in their one-step position. During this time the movement of the total lever 59 causes the sectors 121 to be shifted laterally by means of the parts 131 to 137, inclusive. Following the dwell portion, the cam slot 148 has another inclined portion which causes further movement of arms 142 and frees the entire set of studs 138 and 138ᵃ with the parts connected to them for movement to differential positions determined by the arms 167ᵃ controlled by the register pinions. In this manner all the type wheels are positioned under the control of the register.

When the total lever 59 is released, it is restored rearward by the spring 155 acting on the cam member 156, having a cam slot 157 in which the stud 147 on the total lever 59 engages, although, ordinarily, the operator pushes the lever rearward after pulling it forward. As the said lever 59 moves rearward the arms 142 are rocked clockwise and they pick up the studs 138 and 138ᵃ to restore the parts to normal. As the parts are restored to normal position, the sectors 121 are slid laterally so as to be disengaged from the studs 138 and reengaged with the sectors 120. Thus, at the end of a total-taking operation, the parts are restored to normal and the machine is again in condition for item-entering operations.

A full stroke of the total-taking lever is insured by providing it with a full-stroke sector 145, shown in Figs. 11 and 13, with which cooperates a full-stroke pawl 146 operating in the usual manner.

Provision is made for aligning all the type wheels without placing any appreciable load on the keys. Referring to Figs. 4 and 5, it will be recalled that the bail 83 is moved forward by movement of the total lever 59 to total-taking position. As this bail moves forward, it engages a slot 175 (Fig. 5) is a lever 176 pivoted at 177. The forward end of this lever is provided with a toothed sector 178 engaging a gear 179 fixed on an aligning shaft or bail 180. The shaft 180 extends across the group of operating sectors 129 (Fig. 7) adjacent their toothed faces. This shaft is semicircular in cross section and positioned so that, when the shaft is rotated from the position of Fig. 5 to that of Fig. 7, the rounded portion of the shaft will engage between the teeth of the operating sectors 129 to accurately align them and their type wheels in position. The force necessary to rock the lever 176 and rotate the shaft 180 is very small and places no appreciable load on the keys.

3. *Printing hammer operation*

Novel means has been provided for controlling and operating the printing hammer which, in combination with the control and indexing of the type wheels, enables the machine to be operated with an exceedingly light key depression.

Referring to Figs. 4, 19 and 21, the printing hammer 69 is in the form of a bail pivoted on the shaft 105 and urged counterclockwise by a spring 106, connected at one end to a stud on the hammer bail and at the other to a stud on one of the side plates of the paper section, the hammer and its spring being carried by said paper section and being removable with it. The hammer 69 supports a platen 240 that extends laterally across all the type wheels so that, when the hammer is fired, the platen will be able to make an imprint from each of the seven type wheels. The line on which the platen strikes is called the printing line.

The hammer is cocked by forward movement of the bail 83 (Fig. 4), which bail, it will be recalled, is moved forward by depression of the amount keys as well as by movement of the total lever 59. Pivoted on the bail 83 is an arm 110 urged clockwise (Figs. 4 and 21) by a spring 110ᵃ into engagement with a stud 241 on a portion of one of the side plates 61 of the paper section. The forward end of the lever 110 has an abutment face 242 (Fig. 21) positioned to engage a square stud 111 on a downwardly projecting arm 243 of the printing hammer bail. The normal position of the parts is shown in Fig. 4. As the bail 83 approaches the end of its forward movement, the arm 110 is cammed counterclockwise by the stud 241 (Fig. 21) which engages in a cam slot formed by the edge of said arm and a projection 244 on it. This moves the abutment end 242 away from the stud 111 and suddenly frees the printing hammer which is thereupon fired to printing position with a percussive action by its spring 106.

Figure 22:
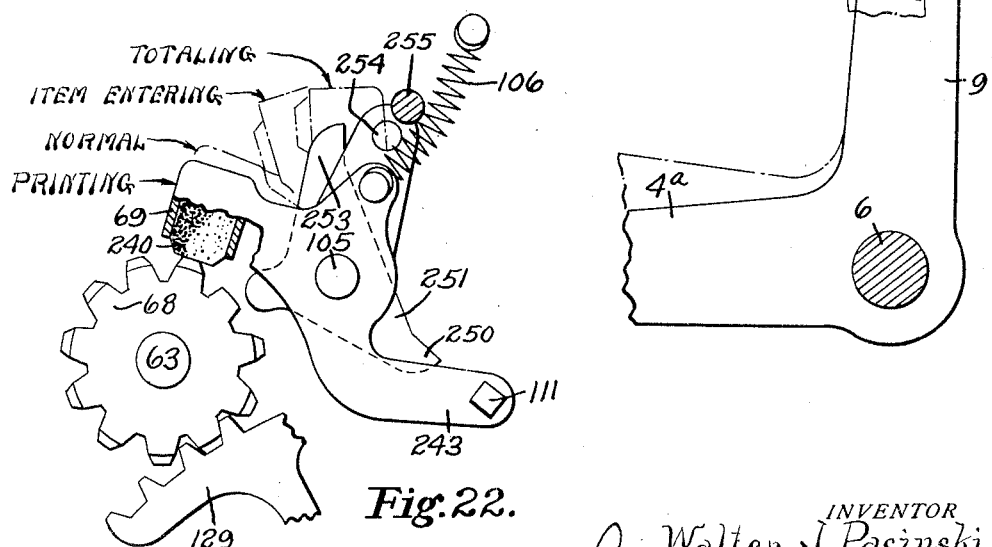
Fig. 22 is an enlarged right side elevation of the type wheels and printing hammers showing the several positions of the hammer.

The normal position of the hammer is the dot-dash position marked "normal" in Fig. 22. When cocked by the above described movement of bail 83, which is a movement caused by depression of the amount keys, the hammer is moved to the dot-dash position of Fig. 22 marked "Item entering" and the spring 106 is tensioned with just sufficient force to enable the platen to make a clear impression from the three "item" type wheels only, no printing impressions being made from the "extra" type wheels because blank spaces are at the printing line.

In total printing, an imprint is made from all the type wheels no matter what the total may be. If the total is less than the seven-wheel capacity of the type wheels, "O's" will be printed to the left, which distinguishes the item as a total. Obviously, if the impression from all the type wheels is to be as clear as that from the three "item" type wheels, the hammer must be driven to printing position with greater force in totaling than in item-printing operations. If, however, the hammer is cocked by the bail 83 and fired with only sufficient force to make a clear impression from three type wheels, it will not make as clear an impression from seven type wheels and the print will not be the same character; that is, it will be lighter than the item print. Clear and uniform impressions are desired. Accordingly, provision is made for firing the hammer with a greater degree of force when all the type wheels are indexed in total taking and when an imprint is desired from all of them.

When the total lever 59 is rocked forward, the bail 83 is moved forward as in item-entering operations and the arm 110 acts to cock the printing hammer as previously explained. But the printing hammer spring is given an additional tension in total taking as follows:

Referring to Fig. 4, the total lever is provided with a projection 113 that is integral with it and that moves forward as said lever moves forward. Positioned in the path of this projection, as shown in Fig. 4 but best in Figs. 21 and 22, is one arm 250 of a three-armed member 251, shown best in Figs. 19 and 20, where it is viewed from the side opposite to that shown in the other figures. This three-armed member is pivoted on the shaft 105 and urged to a normal position by a centering spring 251ᵃ (Fig. 21). The three-armed member 251 has an upwardly extending arm 253 positioned to engage a stud 254 on the printing hammer bail 69.

Figure 20:
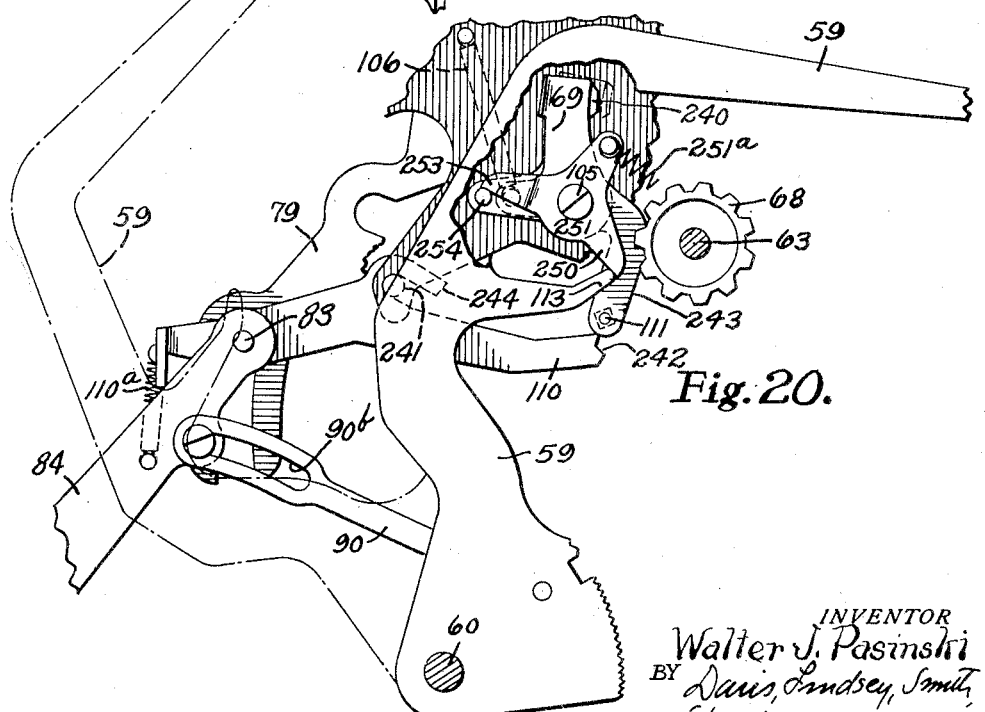
Fig. 20 is an enlarged left side elevation of some of the operating elements of the printing mechanism.

As the total-taking lever is moved from the dot-dash to the full-line position of Fig. 20, and as it approaches the end of its movement to total-taking position, the projection 113 engages the arm 250 of the three-armed member 251 and rocks it counterclockwise in Figs. 19 and 20 which is clockwise in Fig. 4. The arm 253, engaging the stud 254, thereupon rocks the printing hammer bail 69 counterclockwise beyond the position to which it is moved by bail 83 and arm 110 to stretch the spring 106 a greater distance than in item-entering operations. The distance that the hammer is moved in this total-taking operation is shown by dot-dash position in Fig. 22 marked "Totaling." In other words, when the total lever is moved to total-taking position, the printing hammer is not only cocked as usual but the spring is given a greater tension by additional mechanism operated by said total-taking lever. There is ample force available for giving the spring this extra tension because the total-taking lever is a long one with ample leverage, and it is the only member the operator has to move in the total-taking operation.

When the printing hammer is fired in both item-entering and totaling operations, it is moved past its "normal" to a "printing" position as illustrated in Fig. 22. Printing occurs with a sharp percussive action after which the printing hammer is returned to normal by its spring 106. It is then in a position to permit shifting of the paper P from visible to printing position and return. Provision is made for preventing rebound of the hammer by providing a stud 255 (Figs. 4, 21 and 22) for snubbing the spring 106, but this rebound feature has not been claimed in the present case, the same being the subject matter of copending application Serial No. 147,431, filed June 10, 1937, where it is disclosed and described in more detail.

Impressions on the paper P are made by means of an ink ribbon R (Figs. 4 and 21) which extends over the printing line of the type wheels and between said wheels and the paper strip. This ink ribbon is carried by two spools mounted on shafts 96 and 97 carried by detachable frame 95 that hooks over a shaft 95ᵃ and rests on the shaft 63. The ink ribbon unit may be detached as a unit after the paper section has been detached. This facilitates replacement of ribbons.

The ink ribbon is moved step by step by means of pawls 100 and 101 carried by a three-armed member 102 pivoted on a shaft 102ᵃ (Fig. 4). These pawls are positioned for alternate engagement with ratchet wheels 98 and 99 fixed to the shafts on which the ribbon spools are mounted. The three-armed member 102 has a downwardly projecting arm 102ᵇ provided with two notches for engagement over a stud 102ᶜ on an arm or slide 102ᵈ carried by an arm 102ᵉ pivoted on shaft 102ᵃ, said slide being urged upward by a spring 102ᶠ. The slide 102ᵈ, together with its arm 102ᵉ, is rocked clockwise in Fig. 4 and returned counterclockwise by each movement of the universal bail 11 acting through an arm 103 having a stud 103ᵃ engaging a cam slot 103ᵇ in the lever 102. In a position of the parts shown in Fig. 4, the pawl 100 is active to operate the ratchet wheel 98. This will occur in each operation of the machine by the amount keys. When the ribbon has been exhausted from the spool 97 to which it is attached, said ribbon will resist movement of the ratchet wheel 98 by pawl 100 and this resistance will cause the arm 102ᵉ to move relative to member 102, and the stud 102ᶜ will move to the left-hand notch in arm 102ᵈ. The parts are then positioned so that the stud 101 will be active on the ratchet wheel 99 to move it to wind the ribbon in the opposite direction.

ITEM V. TOTAL PRINTING

In item printing, the operator merely depresses the proper amount keys and releases them, the operation resulting in entering the item in the register and printing it. During this operation, only the "item" type wheels are indexed. No force is required to index the "extra" type wheels or to move them out of printing position. Also, during this operation, the hammer is cocked only sufficiently to obtain a clear impression from the three lower order wheels. This reduces the force required for item printing to a very minimum. It will be appreciated that by far the greatest majority of operations on a cash register of this type are item-entering operations and, consequently, as far as the normal and usual operation of the machine is concerned, the force required for key depression is a minimum because only those parts are conditioned that are necessary for item-entering and printing. No printing occurs in any but the three lower orders as indicated in the sample of work in Fig. 3.

For total printing, the operator grasps the long total lever 59 and pulls it forward. The leverage is large and consequently additional parts may be easily operated. During this total-taking operation, all the type wheels are indexed under the control of the register and the printing hammer is fired with a greater degree of force so as to obtain a clear printing impression from all the type wheels, which impression will be of the same character as to its being light or heavy as that obtained from the "item" wheels.

This control of both the indexing of the type wheels and of the force of printing impression is a very important advantage of the construction because it enables the machine to be operated with a minimum of force during a major portion of its use and then provides that it may be operated with a greater degree of force, but quite easily, when an extraordinary operation such as total taking is required.

In total taking, the register is cleared and the clearing mechanism directly associated with the register is of the type shown in Horton Patents No. 1,326,504 and 1,415,174, to which reference is made for detail. The mechanism for operating the clearing mechanism will, however, be described.

The clearing operation requires that the pawls 53 (Fig. 6) be released to enable the springs 164 of the levers 162 to rock the levers clockwise to normal and restore the register pinions to normal as described in said Horton patents. For this purpose, the total lever 59 is provided with a stud 187 (Fig. 18) for engagement under certain conditions with the rear hooked end 188 of a two-armed lever 189 pivoted at 190 to a lever 191 and urged clockwise (Fig. 18) by a spring 190ᵃ. The lever 190 is pivoted at 192 to a stationary shaft and it has a forked connection 193 with a stud 194 carried by one arm of a bell crank 195 pivoted at 196. The other arm 197 of this bell crank carries a stud 198 positioned to engage the cam edge of cam lever 199 pivoted at 199ᵃ. The lever 199 has a forked connection 200 with a stud 201 on an arm 202 fixed to a clearing shaft 202ˣ corresponding to the shaft 10 of the Rinsche Patent 1,802,927 and having a series of fingers 203 that are positioned to engage the pawls 53 to disengage the latter from the studs 54. Members corresponding to the members z of the Rinsche Patent 1,802,927, which normally prevent backward rotation of the register wheels during item entering operations, are also operated, as disclosed in said Rinsche patent, by parts actuated by the shaft 202ˣ to free the register wheels for reverse rotation in clearing operations.

Normally, the two-armed lever 189 is held in the position of Fig. 18 by a lever 206 pivoted at 207, the lever end of said lever engaging a stud 205 in the lever 189. The parts are held in this position by a lock that later will be described. In this position of the parts, the end 188 of lever 189 is above the path of the stud 187 and the clearing mechanism will not be operated when the total lever is moved.

When the total lever 59 is pulled forward, the stud 187 passes the lever 189 and said hooked end 188 of said lever 189 drops over the stud. As the total lever is returned, and near the end of the return movement, the stud 187 engages the hooked end 188 and pulls the lever 189 rearward. This rocks the lever 191 clockwise and it, in turn, acting through the crank 195—197 and cam arm 199, rocks the clearing bail 202 clockwise to move the fingers 203 into engagement with the pawls 53 to disengage the latter from the studs 54. This occurs at the very last part of the return movement of the total lever and, when it occurs, the register pinions are caused to return to zero by the clearing mechanism.

Provision is made for taking a subtotal which consists in taking a total in the usual manner without clearing the register. This is accomplished by retaining the two-armed lever 189 in its normal or ineffective position. It will be apparent that, when the member 206 is in the full-line position of Fig. 18, it will hold the hooked end 188 of member 189 upward in the full-line position of said figure where it is out of the path of the stud 187. When in this position, the movement of the total lever will not operate the clearing mechanism and, hence, the total will be taken and printed but allowed to remain in the register.

KEY LOCK CONTROL

It is often happens that the operator desires to know what total is in the register. However, the proprietor does not want the operator to be able to clear the register. To enable each to exercise the proper control of the machine, a key lock is provided which, when operated by the operator's key, permits only a subtotal to be taken, but, when operated by the proprietor's key, enables either a subtotal or a total to be taken.

The total lever 59 normally lies beneath the top plate 208 of the machine (Fig. 1) which plate is normally concealed by the hinge cover 209 controlled by a key lock 210. When the cover 209 is closed, the operator can observe the entries on the paper through the sight opening 209ᵃ, but, otherwise, the interior of the machine is inaccessible and nonvisible. By raising the cover, the operator can observe the amount standing on the item counters 211, he may read the register dials 36 and he gains access to the printing section. The key lock 210 for the cover 209 is one lock which can be opened by both the operator's and the proprietor's keys.

The total lever is normally concealed by a shutter 213 (Figs. 1 and 17) which is under the control of a key lock 214 (Fig. 1) that may be operated by either the operator's key 215 (Fig. 15) or the proprietor's key 216. As stated, both these keys also fit the lock 210 so that both the operator and the proprietor can unlock the lid 209. Both the operator's and the proprietor's keys will operate the locks 214 to move the shutter 213 and both of them release the total lever 59 for its full operation by either the proprietor or the operator, but the same type of operation of this lever by the operator will result in taking only a subtotal, whereas its operation by the proprietor may result in taking either a total or a subtotal at the proprietor's option.

The key lock 214 (Figs. 14–17) is of the tumbler type and the left-hand tumbler 217 is normally off center as shown in Figs. 15 and 16, being urged to this position by a spring shown in Fig. 16.

When the operator's key 215 (Fig. 15) is inserted, the tumbler 217 is not centered, which means that the cylinder 218 can be moved only in one direction, that is, counterclockwise in Fig. 16. However, if the proprietor's key 216 is inserted, a rise on it will center the tumbler 217 allowing the cylinder to be turned in either direction. Rotation of the lock cylinder controls mechanism as follows:

When the cylinder is rotated by the operator, he can rotate it counterclockwise only in Fig. 14. As it moves, a stud 220 on an arm 219 fixed to the cylinder moves with it. The stud 220 first engages the cam edge of a lever 221 pivoted at 222 and urged clockwise by a spring 226. The lever 222 has another arm 223 that, normally, is positioned in front of a stud 224 on the shutter 213. The first action is, therefore, to unlock the shutter 213.

As the cylinder is rotated farther counterclockwise beyond the position for unlocking the shutter 213, the stud 220 engages the end of a slide 225 and moves it to the left, said slide being urged to the right in Fig. 14 by the spring 226. The right-hand end of slide 225 has a hook connection 227 with the shutter 213 which is pivoted at 228 to the plate 208 as shown in Fig. 14. The movement of the slide 225 to the left rocks the shutter counterclockwise in Fig. 14 to move said shutter to open position.

Thus, when the operator inserts his key and turns the lock to the left or counterclockwise, the first action is to unlock the shutter 213 and the next action is to move the shutter so as to make the total lever 59 accessible.

When the operator moves the total-taking lever, all that he will obtain is a subtotal. The arm 219 on the lock cylinder has a bent extension 230 (Figs. 14 and 17) whose elbow is normally in front of a stud 231 (Fig. 14) on an arm 232 forming a portion of a slide 233 having studs 234 mounted in slots in the slide 225. The slide 233 has a forked connection 235 with one arm of a bell crank 236 pivoted at 237, the other arm of this bell crank having a forked end 238 that is astride the lever 206 that controls the position of the member 189 (Fig. 18). The slide 233, normally, is prevented from moving to the left in Fig. 14 by the extension 230 which is in front of the stud 231, but the slide 225 can move to the left to unlock and move the shutter 213 by reason of the stud and slot connection 234 between the two slides. The result is that, normally, the bell crank 236 cannot be rocked clockwise from its Fig. 14 position in which position it holds the lever 206 in the Fig. 18 position with the member 189 ineffective. The turning of the lock cylinder 218 counterclockwise in Fig. 14 does not release the slide 233 because the cam edge of the extension 230 passes in front of stud 231. Consequently, when the key lock is turned counterclockwise by the operator's key, the lever 206 cannot be moved and all that the operator can obtain by moving the total lever is a subtotal.

However, when the proprietor's key 216 is used, the lock cylinder 218 can be moved in either direction. If the proprietor merely wishes to take a subtotal in the same manner as the operator, he can do so by turning the lock to the left or counterclockwise. On the other hand, if he wants a total that will clear the register, he turns the lock clockwise or to the right. When the lock is turned to the right the stud 220 first acts on the lever 221—223 and unlocks the shutter 213. Further movement of the key causes the end of the bent arm 230 to engage one of the studs 234ᵃ (Fig. 17) carried by the slide 233 to move said slide to the left in Fig. 14 or to the right in Fig. 17. The stud 234ᵃ on the slide 233 engages the end of the slot in the slide 225 and moves the latter to the left in Fig. 14 to open the shutter. Also, as the slide 233 is moved to the left in Fig. 14 or to the right in Fig. 17, the bell crank 236 is rocked clockwise in Fig. 14, or counterclockwise in Fig. 17, which moves the lever 206 in Fig. 18, thereby lowering the member 189 so that its hooked end 188 will be in the path of the stud 187 on the total lever. Subsequently, when the total lever is moved, a total will be taken and the register cleared in a manner heretofore explained.

From the above it will be clear that both the proprietor and the operator can open the shutter to obtain access to the total lever and, in each case, the total lever is free to be moved its full distance. Normally, this total lever will cause a subtotal to be taken; that is, the total will be printed without clearing the register and, as far as the operator's key is concerned, this condition is not changed. However, if the proprietor inserts his key and turns the lock to the right instead of to the left, a mechanism is set so that, when the total lever is moved, the total will be printed and the register cleared.

I claim:

1. A machine of the class disclosed comprising a plurality of item-entering amount keys, a registering mechanism, printing mechanism including a plurality of type-carrying members, certain lower orders of said type-carrying members forming "item" type-carrying members having their "O's" normally positioned at a printing line and having operative connections with said amount keys for indexing, certain higher orders of said type-carrying members comprising "extra" type-carrying members for total taking which normally have blank spaces at the printing line, and total-taking control means operable, when conditioned for total taking, to disable the connections between said amount keys and said "item" type-carrying members and to place all the type-carrying members under the control of the registering mechanism for total taking, said total-taking control means including mechanism operating to move said "extra" type-carrying members one step before the "item" type-carrying members are moved to thereby bring all the type wheels into correct relative relation for total taking.

2. A machine of the class disclosed comprising a plurality of item-entering amount keys, a registering mechanism, printing mechanism including a plurality of type-carrying members, certain lower orders of said type-carrying members forming "item" type-carrying members having their "O's" normally positioned at a printing line, certain higher orders of said type-carrying members comprising "extra" type-carrying members for total taking which normally have blank spaces at the printing line, a rockable and slidable means having connections with said "item" type-carrying members and said amount keys such that depression of said keys will rock said means to index said "item" type-carrying members, differential devices set by said registering mechanism in accordance with the total in said mechanism, and total-taking control means operable, when conditioned for total taking, to cause said "extra" type-carrying members to be moved one step, to then slide said rockable and slidable means into operative relation to said differential devices, and to then cause all of said type-carrying members to be moved to positions determined by said differential devices.

3. A machine of the class disclosed having a plurality of item-entering amount keys, a registering mechanism, a plurality of type-carrying members, certain lower orders of said type-carrying members comprising "item" type-carrying members provided with operative connections with said amount keys for indexing and normally having their "O's" at a printing line, certain higher orders of said type-carrying members comprising normally inactive, "extra" type-carrying members for total taking which normally have blank spaces at said printing line, a platen hammer along said printing line of sufficient size to make impressions from all said type-carrying members, means operated by said amount keys for cocking and firing said hammer with the minimum force necessary to obtain a clear impression from said "item" type-carrying members only, total-taking control means operable to place all of said type-carrying members under the control of said registering mechanism for total taking and including mechanism for bringing said "item" and said "extra" type-carrying members into correct relation with one another for control by said registering mechanism to bring type to said printing line in all orders of said type-carrying members, and means operated by said total-taking control means for causing said printing hammer to be cocked and fired with a greater force in total printing than in item printing to obtain an impression from all said type-carrying members of substantially the same clearness and intensity as that obtained from said "item" type-carrying members only in item printing.

4. A machine of the class disclosed having a plurality of item-entering amount keys, a registering mechanism, a plurality of rotatable type wheels, certain lower orders of said type wheels comprising "item" type wheels provided with operative connections with said amount keys for indexing and normally having their "O's" at a printing line, certain higher orders of said type wheels comprising normally inactive, "extra" type wheels for total taking which normally have blank spaces at the printing line, a platen hammer along the printing line of sufficient size to make impressions from all said type wheels, means operated by a bail actuated by said amount keys for tensioning a hammer spring and releasing said hammer to cause it to strike with the minimum force necessary to obtain a clear impression from said "item" type wheels only, total-taking control means operable to place all of said type wheels under the control of said registering mechanism for total taking and including mechanism for bringing said "item" and said "extra" type wheels into correct relation with one another for control by said registering mechanism to bring type to said printing line for all orders of said type wheels, and means operated by said total-taking control means for additionally tensioning said spring and releasing said hammer to cause it to strike with a greater force in total printing than in item printing to obtain an impression from all said type wheels of substantially the same clearness and intensity as that obtained from said "item" type wheels only in item printing.

WALTER J. PASINSKI.